(12) United States Patent
Kishida et al.

(10) Patent No.: US 8,290,359 B2
(45) Date of Patent: Oct. 16, 2012

(54) OPTICAL FINDER UNIT AND IMAGING APPARATUS

(75) Inventors: Takeo Kishida, Osaka (JP); Masami Sato, Chiba (JP)

(73) Assignee: Sony Corporation (JP)

( * ) Notice: Subject to any disclaimer, the term of this patent is extended or adjusted under 35 U.S.C. 154(b) by 154 days.

(21) Appl. No.: 12/804,030

(22) Filed: Jul. 13, 2010

(65) Prior Publication Data

US 2011/0026911 A1   Feb. 3, 2011

(30) Foreign Application Priority Data

Jul. 30, 2009   (JP) ............................... P2009-177324

(51) Int. Cl.
  *G03B 13/02* (2006.01)
(52) U.S. Cl. ........................................................ 396/374
(58) Field of Classification Search .................. 396/354, 396/373, 374, 378–381, 383
See application file for complete search history.

(56) References Cited

U.S. PATENT DOCUMENTS

| 2007/0140683 A1* | 6/2007 | Tsujimoto | 396/374 |
| 2008/0187307 A1* | 8/2008 | Okutani | 396/373 |

FOREIGN PATENT DOCUMENTS

JP   2008-015476 A   1/2008

* cited by examiner

*Primary Examiner* — W. B. Perkey
*Assistant Examiner* — Minh Phan
(74) *Attorney, Agent, or Firm* — Lerner, David, Littenberg, Krumholz & Mentlik, LLP

(57) ABSTRACT

An optical finder unit includes: light guide means for guiding an optical image of a subject to a finder window through an internal space formed in the optical finder unit; and a display unit capable of displaying information on the finder window through the internal space when the display unit is in a set state in which the display unit is set in a predetermined position, wherein the display unit in the set state blocks an opening communicating with the internal space, and the display unit can transit from the set state to a non-set state in which the display unit is not set in the predetermined position but unblocks the internal space.

8 Claims, 12 Drawing Sheets

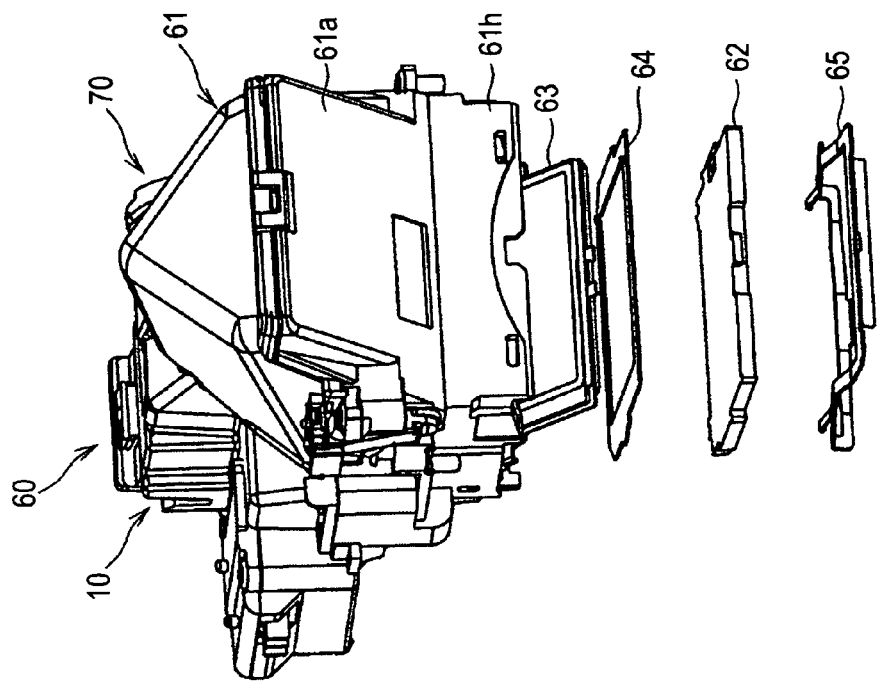
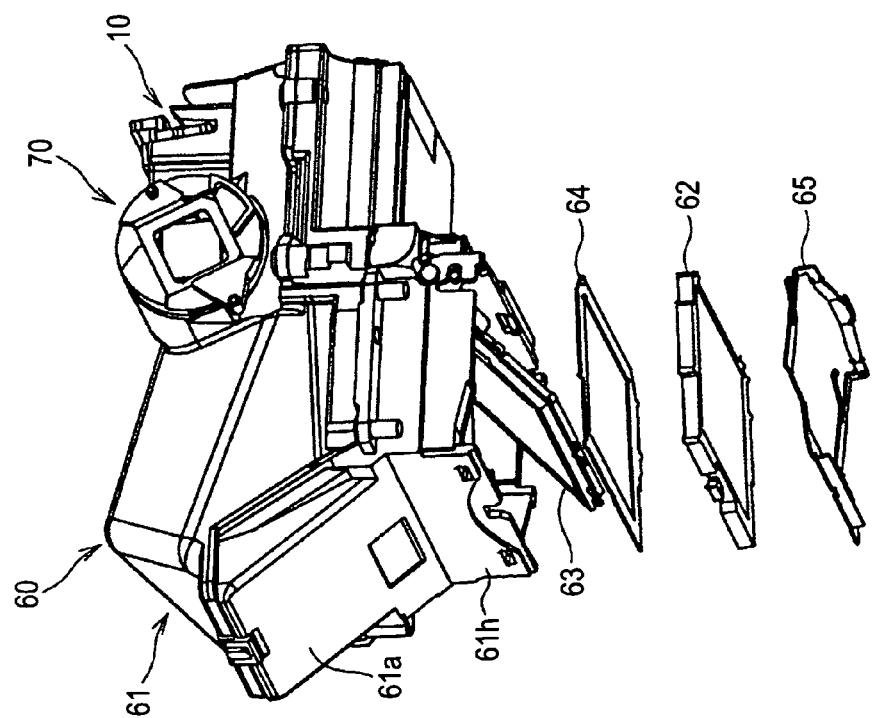

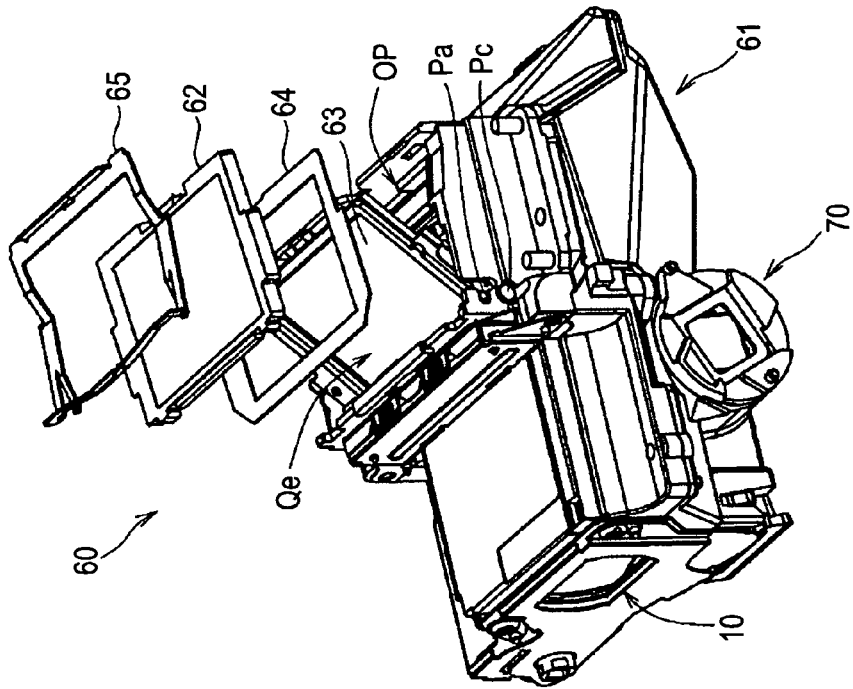
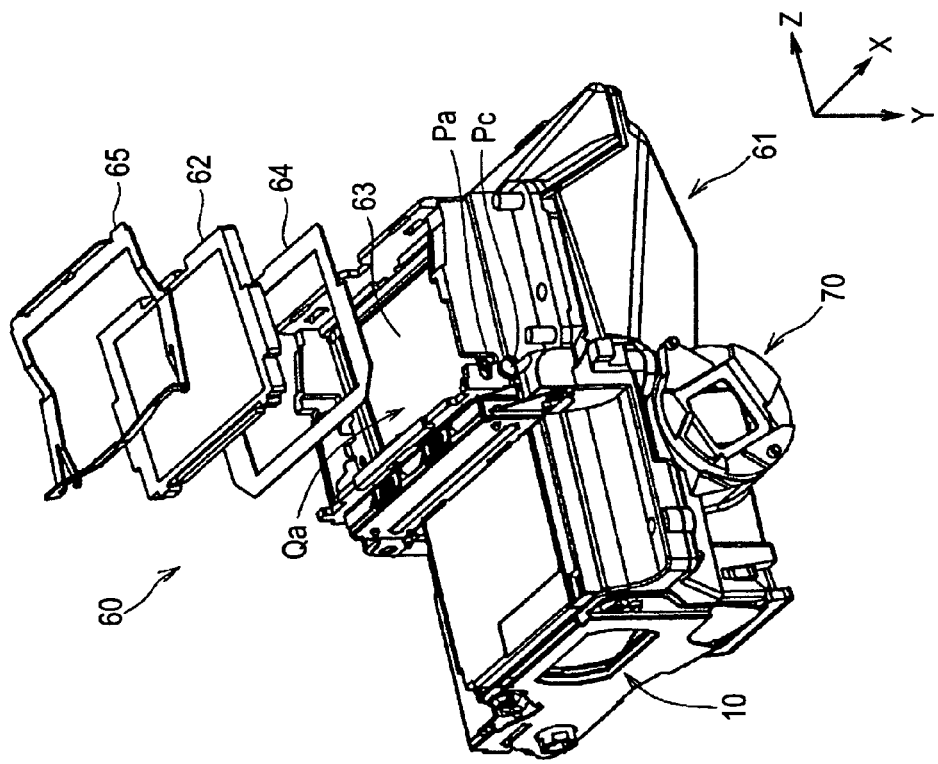

FIG.12A
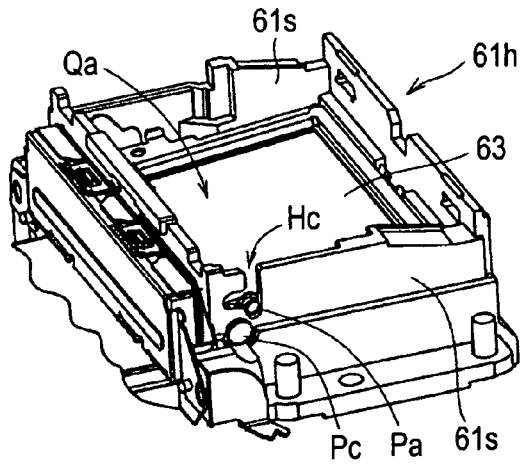
FIG.12B
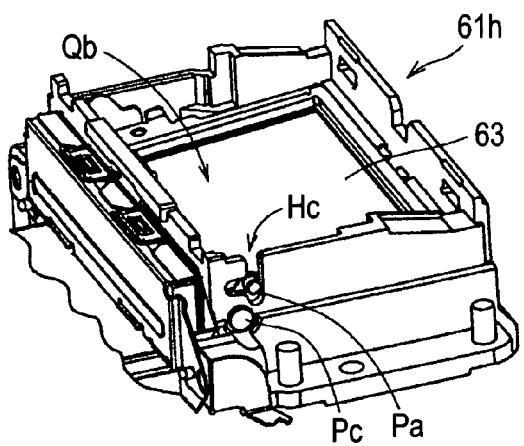
FIG.12C
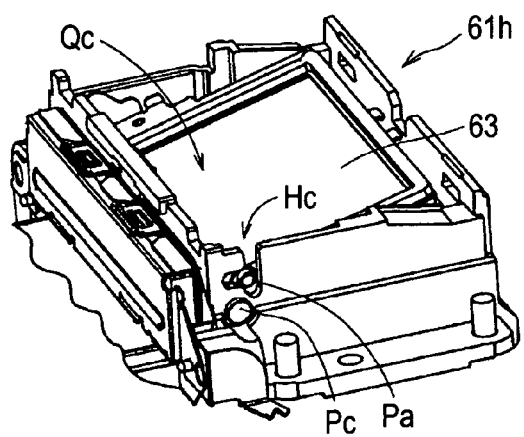
FIG.12D
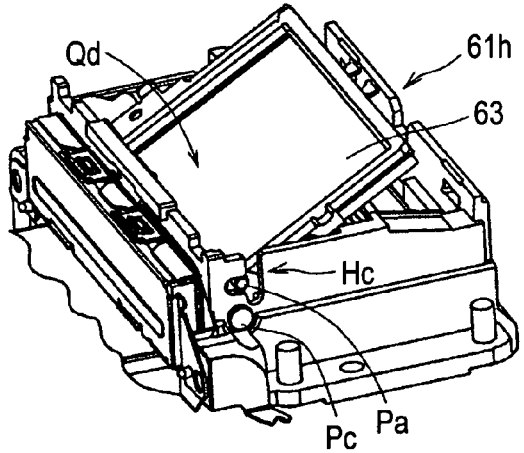
FIG.12E
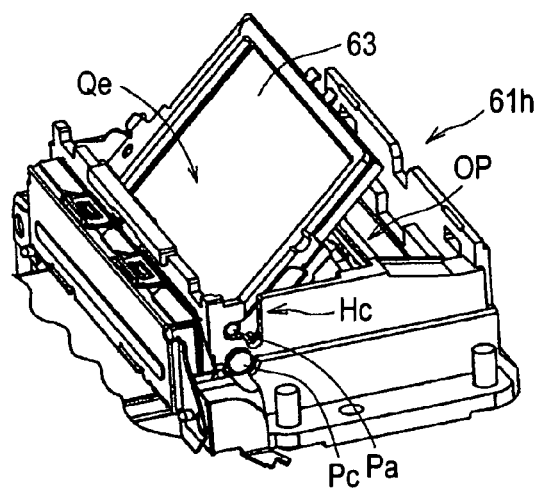
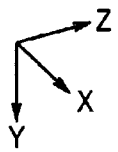

OPTICAL FINDER UNIT AND IMAGING APPARATUS

CROSS-REFERENCE TO RELATED APPLICATION

The present application claims priority from Japanese Patent Application No. JP 2009-177324 filed in the Japanese Patent Office on Jul. 30, 2009, the entire content of which is incorporated herein by reference.

BACKGROUND OF THE INVENTION

1. Field of the Invention

The present invention relates to a technology for an optical finder unit with a display section.

2. Description of the Related Art

A single-lens reflex camera (imaging apparatus) configured, for example, as a digital camera includes an optical finder (optical finder unit) that allows a user to visually recognize an image of a subject through a finder window (see JP-A-2008-15476, for example). Another known imaging apparatus includes a display section (in-finder display section) formed, for example, of a liquid crystal display in an optical finder unit, the display section allowing a user to visually recognize displayed information superimposed on a subject image through a finder window.

Since such an in-finder display section along with the wiring thereof is fixed to the optical finder unit, the optical finder unit is sealed tightly, resulting in improved anti-dust performance.

SUMMARY OF THE INVENTION

In the optical finder unit described above, however, the inside of the optical finder unit is not accessible after the optical finder unit is assembled and incorporated in a mirror box or a camera assembly because the in-finder display section is fixed in the optical finder unit. It is therefore difficult in an assembled imaging apparatus product to remove foreign matter that attaches, for example, to the surface of the in-finder display section that faces inward even when the foreign matter is visually recognized through the finder window.

Foreign matter in the optical finder unit can be removed by disassembling the optical finder unit, but the disassembling operation typically requires tremendous work and cost.

Thus, it is desirable to provide a technology for an optical finder unit that allows foreign matter in the optical finder unit to be readily removed even when the optical finder unit includes a display section.

An embodiment of the invention is directed to an optical finder unit including light guide means for guiding an optical image of a subject to a finder window through an internal space formed in the optical finder unit, and a display unit capable of displaying information on the finder window through the internal space when the display unit is in a set state in which the display unit is set in a predetermined position. The display unit in the set state blocks an opening communicating with the internal space, and the display unit can transit from the set state to a non-set state in which the display unit is not set in the predetermined position but unblocks the internal space.

According to the embodiment of the invention, a display unit capable of displaying information on a finder window through an internal space formed in an optical finder unit when the display unit is in a set state in which the display unit is set in a predetermined position can transit from the set state in which an opening communicating with the internal space is blocked to a non-set state in which the display unit is not set in the predetermined position but unblocks the internal space. As a result, foreign matter in the optical finder unit can be readily removed even when the optical finder unit includes the display unit.

BRIEF DESCRIPTION OF THE DRAWINGS

FIGS. 6A and 6B are exterior views for describing components attached to a lower portion of the optical finder;

FIGS. 11A and 11B are perspective views for describing an opening and closing action of the display unit;

FIGS. 12A to 12E are other perspective views for describing the opening and closing action of the display unit;

DESCRIPTION OF THE PREFERRED EMBODIMENTS

Embodiment

[Configuration of Key Portion of Imaging Apparatus]

Figure 1:
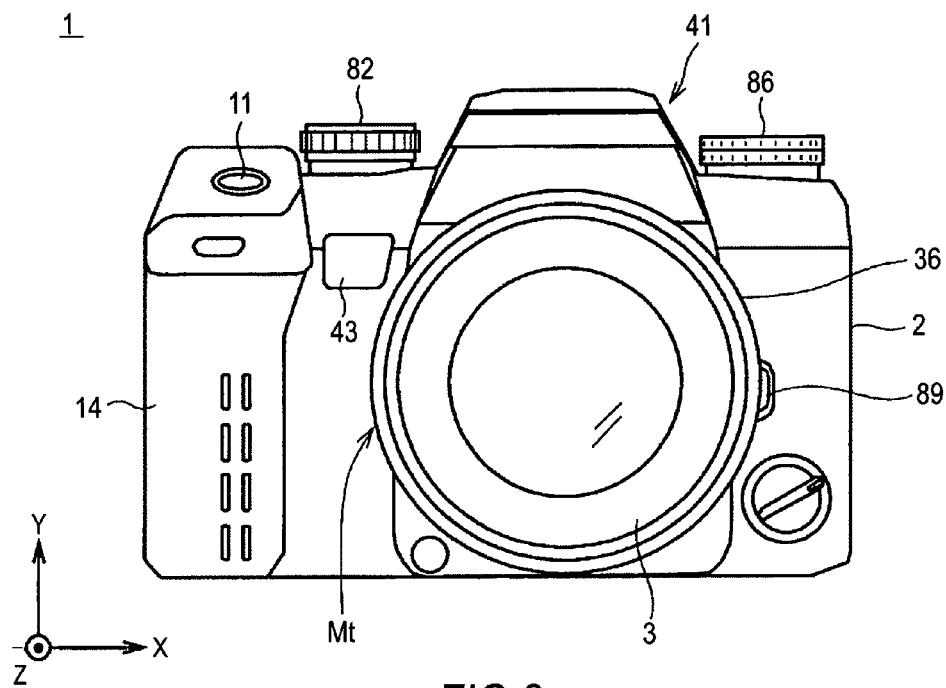
FIG. 1 shows an exterior configuration of an imaging apparatus according to an embodiment of the invention.
Figure 2:
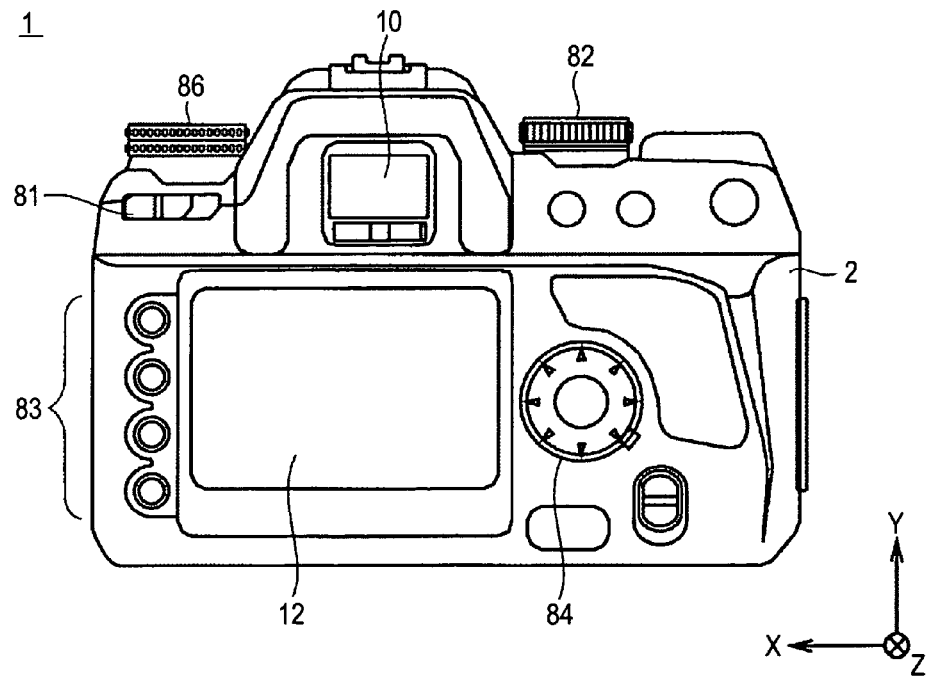
FIG. 2 shows another exterior configuration of the imaging apparatus.

FIGS. 1 and 2 show exterior configurations of an imaging apparatus 1 according to an embodiment of the invention. FIG. 1 is a front exterior view of the imaging apparatus 1, and FIG. 2 is a rear exterior view of the imaging apparatus 1. The imaging apparatus 1 is configured as an interchangeable single-lens reflex digital camera.

As shown in FIG. 1, the imaging apparatus 1 includes a camera body 2. An interchangeable imaging lens unit (interchangeable lens) 3 can be attached and detached to and from the camera body 2.

The imaging lens unit 3 primarily includes a lens barrel 36, and a lens group 37 (see FIG. 3), a diaphragm, and other components provided in the lens barrel 36. The lens group 37, which works as an imaging optical system, includes a focus lens that moves in the optical axis direction to change the focus position.

The camera body 2 includes an annular mount Mt that is disposed in a substantially central portion of the front side and to which the imaging lens unit 3 is attached, and an attaching and detaching button 89 that is disposed in the vicinity of the annular mount Mt and used to attach and detach the imaging lens unit 3.

The camera body 2 further includes a mode setting dial 82 in an upper left portion of the front side and a control value setting dial 86 in an upper right portion of the front side. Operating the mode setting dial 82 allows a user to set (switch) a variety of modes provided in the camera (including a variety of imaging modes (such as a portrait imaging mode, a scenery imaging mode, and a fully automatic imaging mode), a reproducing mode for reproducing a captured image, and a communication mode for sending and receiving data to and from an external apparatus). Operating the control value setting dial 86 allows the user to set controls values in the variety of imaging modes.

The camera body 2 further includes a grip 14 that is disposed at the left end of the front side and gripped by the photographing user. A release button 11 for instructing the camera to start exposure is provided on the upper side of the grip 14. The grip 14 has a battery compartment and a card compartment provided therein. The battery compartment houses a nickel hydrogen rechargeable battery or any other suitable secondary battery or an alkaline dry battery or any other suitable primary battery as a power source of the camera, and the card compartment detachably houses a memory card 90 (see FIG. 3) for recording image data of captured images.

The release button 11 is a two-stage detection button capable of detecting two states, a half-pressed state (S1 state) and a fully-pressed state (S2 state). When the release button 11 is pressed halfway into the S1 state, preparation actions (such as an AF control action and an AE control action) for capturing a still image of a subject to be recorded (final captured image) are carried out. When the release button 11 is further pressed into the S2 state, actions of capturing the final captured image are carried out (a series of actions including exposing an imaging device 5 (which will be described later) to an image of the subject (an optical image of the subject) and performing predetermined image processing on an image signal obtained by the exposure action).

In FIG. 2, a finder window (eyepiece window) 10 is provided in a substantially upper central portion of the back side of the camera body 2. The photographing user can look into the finder window 10 and visually recognize the optical image of the subject guided through the imaging lens unit 3 to determine a composition. The configuration of an optical finder 60 (see FIG. 4) including the finder window 10 will be described later in detail.

In FIG. 2, a backside monitor 12 is provided in a substantially central portion of the back side of the camera body 2. The backside monitor 12 is formed, for example, of a color liquid crystal display (LCD). The backside monitor 12 can display a menu screen for setting imaging and other conditions and reproduce and display in the reproducing mode a captured image recorded on the memory card 90. When the operator chooses to determine a composition by using live-view display (electronic finder) instead of determining a composition by using the optical finder, the backside monitor 12 displays a plurality of time-series images (that is, video images) captured by an imaging device 7 (which will be described later) as live-view images.

A main switch 81 is provided to the upper left of the backside monitor 12. The main switch 81 is formed of a two-contact-point slidable switch. When the contact is set to a left "OFF" position, the power source is turned off, whereas when the contact is set to a right "ON" position, the power source is turned on.

A direction selectable key 84 is provided to the right of the backside monitor 12. The direction selectable key 84 has a circular operation button and detects four directional pressing operations, up, down, right, and left, on the operation button and another four directional pressing operations, upper right, upper left, lower right, and lower left, on the operation button. The direction selectable key detects a pressing operation on a center push button as well as the above eight directional pressing operations.

A group of setting buttons 83 is provided to the left of the backside monitor 12. The group of setting buttons 83 is formed of a plurality of buttons for performing various operations including setting parameters in the menu screen and deleting images.

Figure 3:
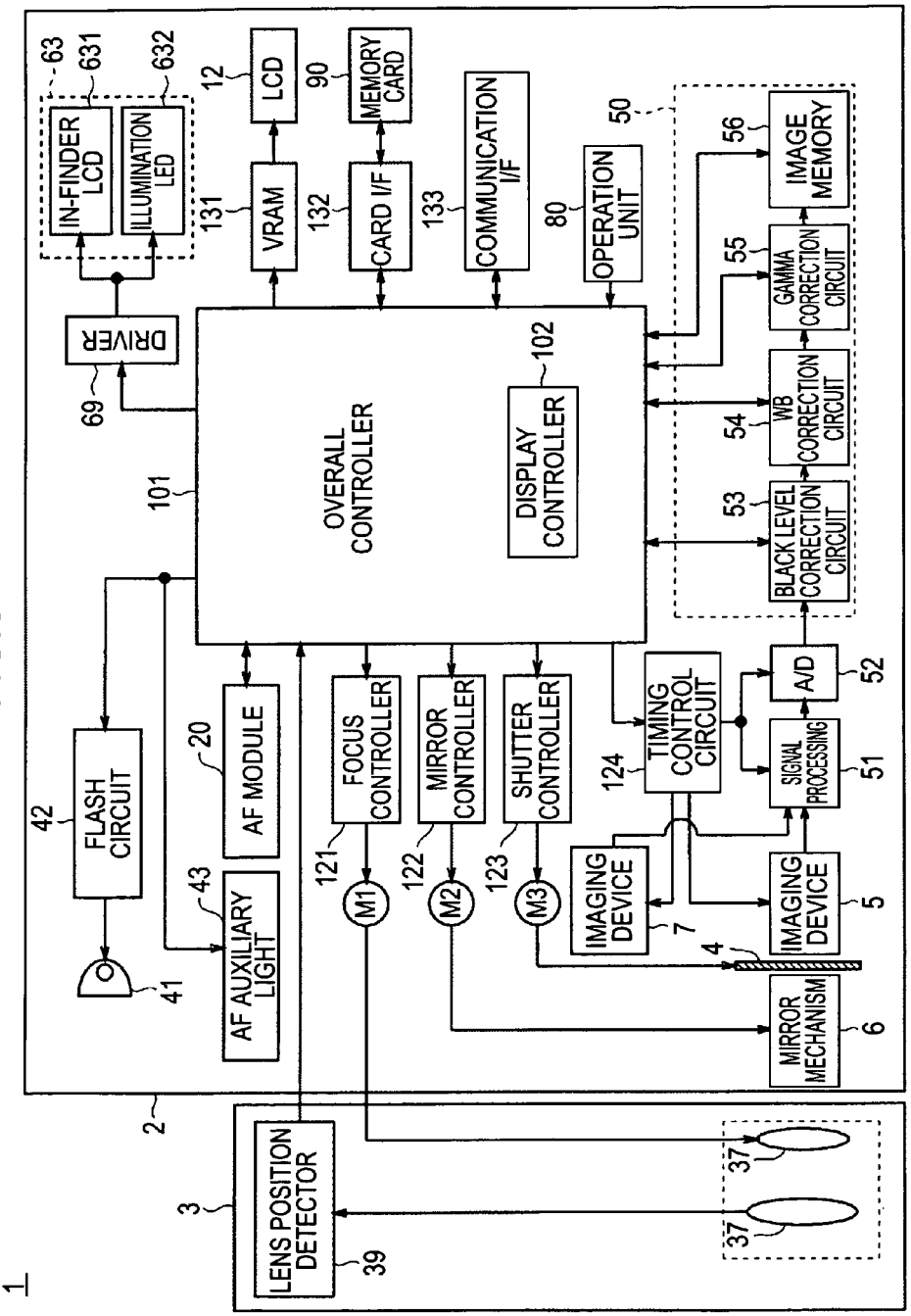
FIG. 3 is a block diagram showing a functional configuration of the imaging apparatus.

The functions of the imaging apparatus 1 will be summarized with reference to FIG. 3. FIG. 3 is a block diagram showing a functional configuration of the imaging apparatus 1.

As shown in FIG. 3, the imaging apparatus 1 includes an operation unit 80, an overall controller 101, a focus controller 121, a mirror controller 122, a shutter controller 123, a timing control circuit 124, and a digital signal processing circuit 50.

The operation unit 80 is formed of a variety of buttons, switches, and other components including the release button 11 (see FIG. 1). The overall controller 101 achieves a variety of actions in response to an input operation performed by the operator through the operation unit 80.

The overall controller 101 is formed of a microcomputer and primarily includes a CPU, a RAM, and a ROM.

The overall controller 101 reads a program stored in the ROM and executes the program in the CPU to achieve a variety of functions software-wise. For example, the overall controller 101 cooperates with an AF module 20, the focus controller 121, and other components to carry out focus control in which the position of the focus lens is controlled. The overall controller 101 uses the focus controller 121 to perform an AF action based on the subject's focus state detected by the AF module 20. The AF module 20 can use the light incident through a mirror mechanism 6 along with a phase difference-based focus state detection method (phase difference-based AF) to detect the subject's focus state.

The overall controller 101 further includes a software-based display controller 102. The display controller 102 provides an electronic finder that performs live-view display (pre-view display) of the subject on the backside monitor 12 before final imaging based on image signals successively produced by the imaging device 5 or 7.

The focus controller 121 produces a control signal based on a signal inputted from the overall controller 101 and drives a motor M1 in accordance with the control signal to move the focus lens, which is part of the lens group 37 in the imaging lens unit 3. The position of the focus lens is detected by a lens position detector 39 in the imaging lens unit 3, and data representing the position of the focus lens is sent to the overall controller 101. The focus controller 121, the overall controller 101, and other components thus control the motion of the focus lens in the optical axis direction.

The mirror controller 122 switches the state of the mirror mechanism 6 between a state in which it retracts from the optical path (mirror-up state) and a state in which it blocks the optical path (mirror-down state). The mirror controller 122 switches the state of the mirror mechanism 6 between the mirror-up state and the mirror-down state by producing a control signal based on a signal inputted from the overall controller 101 and driving a motor M2 in accordance with the control signal.

The shutter controller 123 produces a control signal based on a signal inputted from the overall controller 101 and drives a motor M3 in accordance with the control signal to open and close a shutter 4.

The timing control circuit 124 performs timing control on the imaging device 5 and other components.

The imaging device 5, which is formed, for example, of a CMOS sensor, converts an optical image of the subject into an electric signal in a photoelectric conversion process, and produces an image signal related to a final captured image (image signal to be recorded). The imaging device 5 is also described as an imaging device for recording images (for capturing images to be recorded).

The imaging device 5 is exposed to the subject image focused on a light receiving surface (accumulates electric charge produced in the photoelectric conversion process) in response to drive control signals (accumulation start signal and accumulation end signal) inputted from the timing control circuit 124 and produces an image signal related to the subject image. The imaging device 5 outputs the image signal to a signal processor 51 including an AGC (Auto Gain Control) circuit in response to a readout control signal inputted from the timing control circuit 124. The timing signal (sync signal) from the timing control circuit 124 is also inputted to the signal processor 51 and an A/D (analog/digital) conversion circuit 52.

The signal processor 51 performs predetermined analog signal processing (such as optimizing the brightness level of the image, for example, by increasing the gain in the AGC circuit) on the image signal acquired by the imaging device 5, and the A/D conversion circuit 52 converts the image signal having undergone the analog signal processing into digital image data (image data). The image data are inputted to the digital signal processing circuit 50.

The digital signal processing circuit 50 performs digital signal processing on the image data inputted from the A/D conversion circuit 52 and produces image data related to the captured image. The digital signal processing circuit 50 includes a black level correction circuit 53, a white balance (WB) correction circuit 54, a gamma correction circuit 55, and an image memory 56.

The black level correction circuit 53 corrects the black level of each of the pixel data that form the image data outputted from the A/D conversion circuit 52 to a reference black level. The WB correction circuit 54 adjusts the white balance of the image. The gamma correction circuit 55 converts the grayscales of the captured image. The image memory 56 is a high-speed accessible image memory for temporarily storing the produced image data. The image memory 56 has a capacity for storing image data corresponding to a plurality of frames.

At the time of final imaging, the image data temporarily stored in the image memory 56 undergo image processing (such as compression) as appropriate in the overall controller 101 and are then stored on the memory card 90 via a card I/F 132.

The image data temporarily stored in the image memory 56 are also transferred by the overall control section 101 to a VRAM 131 as appropriate, and an image based on the image data is displayed on the backside monitor 12. A variety of display modes are thus provided, including confirmation display (after view) for confirming a captured image and playback display for reproducing a captured image.

The imaging apparatus 1 further includes the imaging device 7 in addition to the imaging device 5. The imaging device 7 is disposed in the optical finder 60 (see FIG. 4), which will be described later, and serves as what is called an imaging device dedicated to capturing live-view images (capturing video images). The imaging device 7 has the same configuration as that of the imaging device 5. The imaging device 7, however, only needs to have resolution high enough to produce a live-view image signal (video images), and the number of pixels and the power consumption of the imaging device 7 are typically smaller than those of the imaging device 5.

The same signal processing as that performed on an image signal acquired by the imaging device 5 is performed on an image signal acquired by the imaging device 7. That is, an image signal acquired by the imaging device 7 undergoes the predetermined processing in the signal processor 51, is converted into digital data in the A/D conversion circuit 52, undergoes the predetermined image processing in the digital signal processing circuit 50, and is stored in the image memory 56.

The time-course image data acquired by the imaging device 7 and stored in the image memory 56 are sequentially transferred by the overall controller 101 to the VRAM 131, and images based on the time-course image data are displayed on the backside monitor 12. Video image-like display (live-view display) for determining a composition is thus provided.

The imaging apparatus 1 further includes a communication I/F 133 and can send and receive data to and from an apparatus (personal computer, for example) connected to the interface 133.

The imaging apparatus 1 further includes a flashlight 41, a flashlight control circuit 42, and an AF auxiliary light emitter 43. The flashlight 41 is a light source used, for example, when the subject does not have enough brightness. Turning on and off the flashlight 41, the duration over which the flashlight 41 is turned on, and other parameters are controlled by the flashlight control circuit 42, the overall controller 101, and other components. The AF auxiliary light emitter 43 is an auxiliary light source for the AF operation. Turning on and off the AF auxiliary light emitter 43, the duration over which the AF auxiliary light emitter 43 is turned on, and other parameters are controlled by the overall controller 101 and other components.

The imaging apparatus 1 further includes an in-finder LCD 631 and an illumination LED 632 provided in a display unit (display section) 63 in the optical finder 60, which will be described later. On the in-finder LCD 631 is displayed the position (area) within an imaging range where the subject's focus state can be detected, for example, by the AF module 20. The in-finder LCD 631 and the illumination LED 632 are controlled by the overall controller 101 via a driver (drive circuit) 69. A specific configuration of the display unit 63 will be described later in detail.

[Configuration of key portion of optical finder 60]

Figure 4:
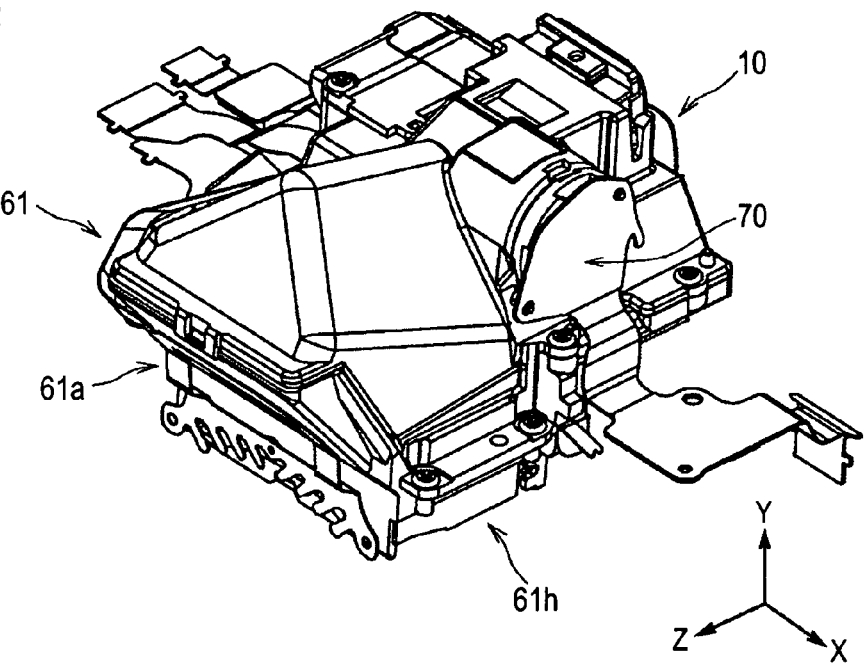
FIG. 4 shows an exterior configuration of an optical finder.
Figure 5:
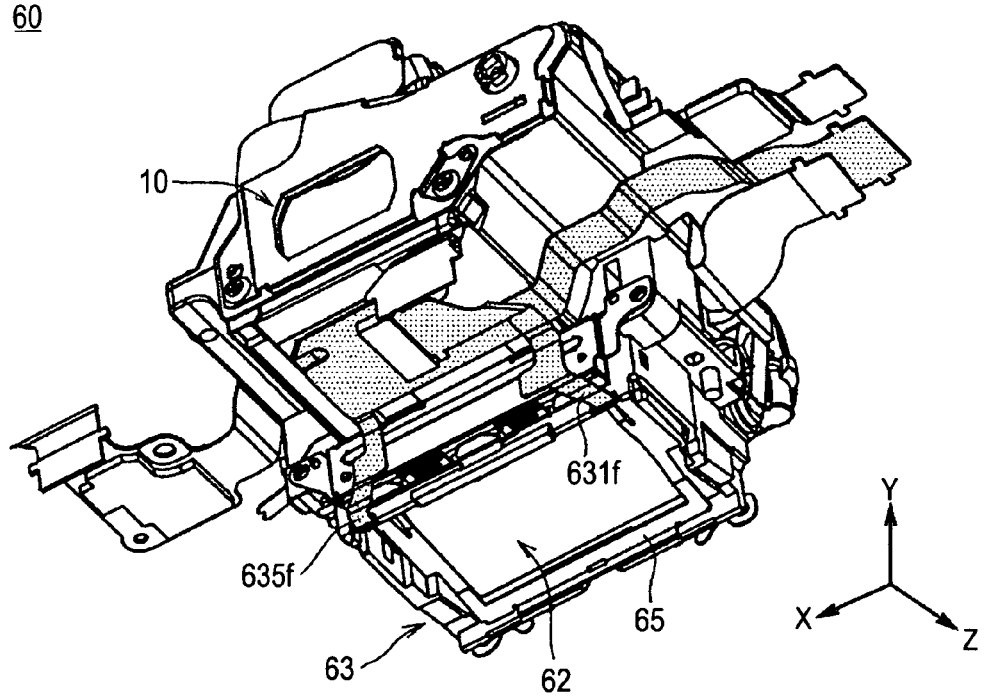
FIG. 5 shows another exterior configuration of the optical finder.

FIGS. 4 and 5 show exterior configurations of the optical finder 60. FIG. 4 is a perspective view of the optical finder 60 viewed from the front but along an upper oblique direction, and FIG. 5 is a perspective view of the optical finder 60 viewed from the rear but along a lower oblique direction.

The optical finder (optical finder unit) 60 is a portion (module) disposed above a mirror box incorporated in the imaging apparatus 1, and the finder window 10 described above is disposed in a rear portion of the optical finder 60. A pentamirror 61 is provided in a front portion of the optical finder 60, and a focus plate 62 held by a bias spring 65 is attached to a lower portion of the optical finder 60.

The pentamirror 61 functions as light guide means for guiding an optical image of the subject to the finder window 10 through an internal space formed in the optical finder 60.

The pentamirror 61 is formed of a plurality of mirrors held on a pentamirror holder 61*h*, and the plurality of mirrors adjust the orientation of the subject optical image displayed on the focus plate 62 and forward the reoriented subject optical image to the finder window 10. The inclination angle of one of the mirrors, a movable mirror 61*a*, is changeable. Changing the angle of the movable mirror 61*a* changes the direction in which the subject light incident through the focus plate 62 into the internal space of the optical finder 60 travels when reflected off the pentamirror 61. In the imaging apparatus 1 of the present embodiment, the following two finder modes can therefore be switched: an OVF (optical finder) mode in which the subject optical image is displayed on the finder window 10 and an EVF (electronic view finder) mode in which the subject optical image is guided to the imaging device 7 held on a holder 70 and the live-view display based on the subject images captured by the imaging device 7 is performed on the backside monitor 12.

FIGS. 6A and 6B are exterior views for describing components attached to a lower portion of the optical finder 60. FIG. 6A is an exploded perspective view of the optical finder 60 viewed from a side but along an oblique direction, and FIG. 6B is an exploded perspective view of the optical finder 60 viewed from the front but along an oblique direction. In FIGS. 6A and 6B, the display unit 63 has the attitude in a fully open position Qe, which will be described later.

The focus plate 62, where the subject optical image having passed through the lens group 37 in the imaging lens unit 3 is focused, can be attached to a lower portion of the optical finder 60. A spacer 64 for precisely positioning the focus plate 62 in the optical axis direction and adjusting the focal distance is interposed between the focus plate 62 and the display unit 63. The bias spring 65, which is a plate spring and produces an upward biasing force oriented toward the optical finder 60, allows the focus plate 62 and the spacer 64 to be housed and held in the pentamirror holder 61*h* under a fixed pressure.

The configuration of the display unit 63 will next be described in detail.

Figure 7:
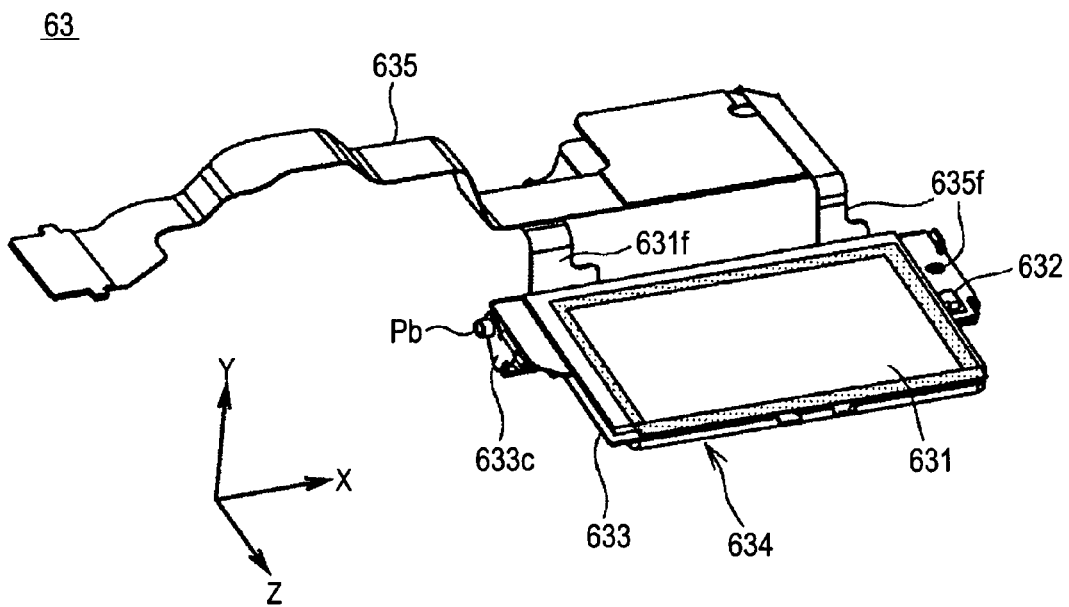
FIG. 7 shows an exterior configuration of a display unit.
Figure 8:
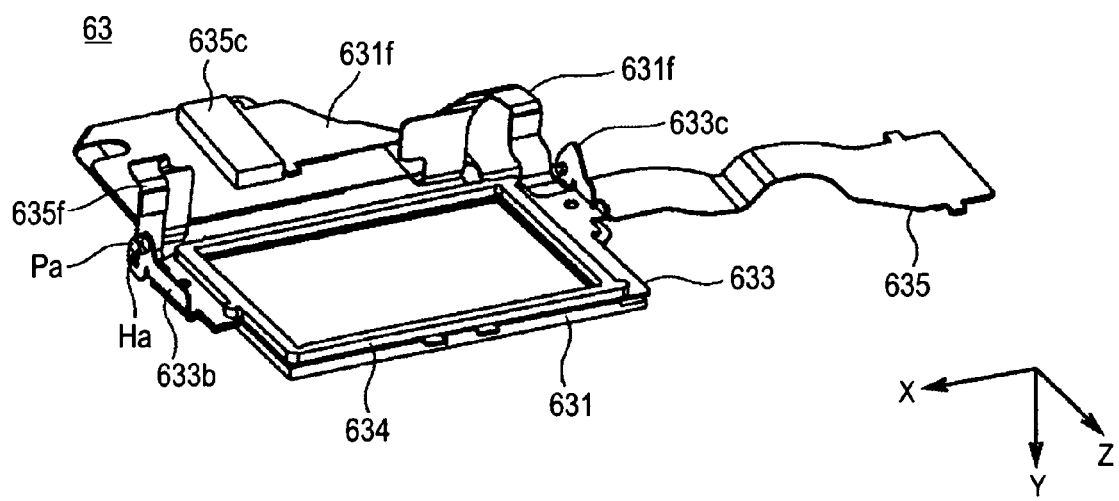
FIG. 8 shows another exterior configuration of the display unit.
Figure 9A:
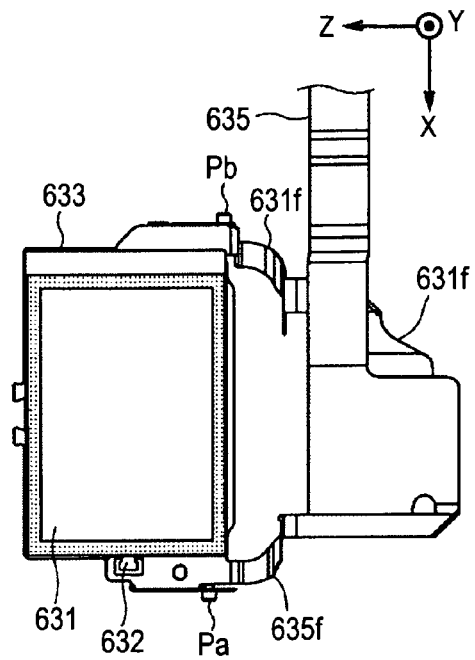
FIGS. 9A and 9B show other exterior configurations of the display unit.
Figure 9B:
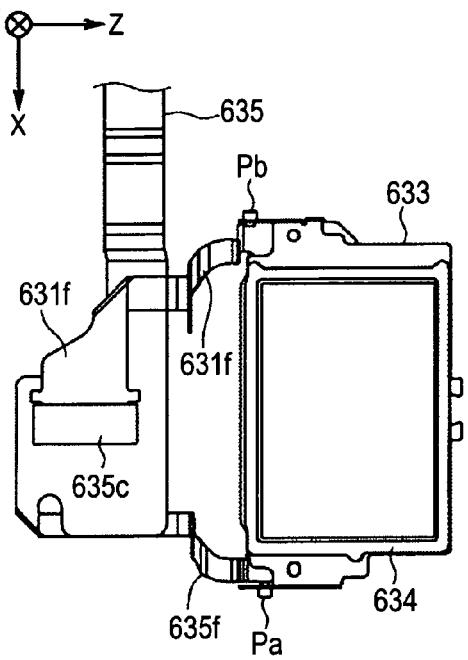
Figure 10:
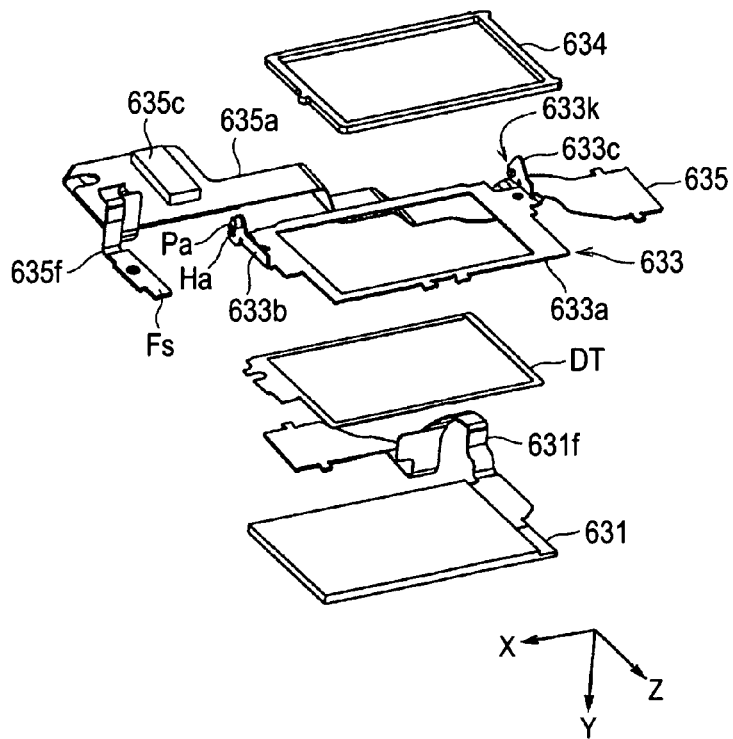
FIG. 10 is an exploded perspective view showing the display unit.

FIGS. 7, 8, 9A, and 9B show exterior configurations of the display unit 63. FIG. 7 is a perspective view of the display unit 63 viewed from the above (+Y direction) but along an oblique direction and FIG. 8 is a perspective view of the display unit 63 viewed from the below (−Y direction) but along an oblique direction with the display unit 63 housed in the optical finder 60 as shown in FIG. 5. FIGS. 9A and 9B are top and bottom views of the display unit 63, respectively. FIG. 10 is a perspective view of the display unit 63 shown in FIG. 8 but exploded in the Y-axis direction.

The display unit 63 includes the in-finder LCD 631 and the illumination LED 632 described above, a holder 633 formed of a metal member, an anti-dust cushion 634 glued to the upper surface of the holder 633, and a flexible printed circuit board (FPC) 635 that forms (part of) the wiring between the display unit 63 and the driver 69 (FIG. 3).

The in-finder LCD 631, which is the heart of the display unit 63, is formed of a transmissive liquid crystal display shaped into a substantially rectangular plate and includes a display screen. The in-finder LCD 631 further includes an LCD FPC 631*f* to be connected to a connector 635*c* provided on a body 635*a* of the FPC 635. The in-finder LCD 631 is positioned by and glued to the holder 633 by using a double-sided tape DT shaped into a substantially rectangular frame.

The holder 633 includes a base 633*a* shaped into a substantially rectangular frame and side portions 633*b* and 633*c* formed by bending both ends of the base 633*a* in the direction perpendicular thereto. The side portion 633*c* has an edge portion 633*k* inclined to the base 633*a* by 47 degrees, and a metal pin Pb that fits into a vertically elongated hole, which will be described later, is fixed to the edge portion 633*k*. A metal pin Pa that engages a cam hole Hc (see FIGS. 12A to 12E), which will be described later, is fixed to the side portion 633*b*, and a circular through hole Ha is formed in the position obliquely below the pin Pa and corresponding to the pin Pb attached to the side portion 633*c*.

The anti-dust cushion 634 is formed of an elastic member made, for example, of polyurethane foam and has an anti-dust capability.

The FPC 635 includes the body 635*a* and an LED FPC 635*f* which is connected to the body 635*a* and on which the illumination LED (light emitter) 632 capable of projecting light, for example, to the display screen of the in-finder LCD 631 is mounted. The tip Fs of the LED FPC 635*f* is glued and fixed to the surface of the holder 633 by using the double-sided tape DT, as in the case of the in-finder LCD 631. It is, however, noted that the LED FPC 635*f* is positioned and glued in such a way that the illumination LED 632 is appropriately spaced apart from the in-finder LCD 631, as shown in FIGS. 7 and 9A.

In the thus configured display unit 63, the LCD FPC 631*f* and the LED FPC 635*f* extend from the vicinity of a shorter side of the in-finder LCD 631 in the direction of the pin Pb and a pin Pc (see FIGS. 11A and 11B and FIGS. 12A to 12E and will be described later), which form a rotary axis (pivotal axis) of the display unit 63, as shown in FIG. 8 (and the mesh portion in FIG. 5), whereby the LCD FPC 631*f* and the LED FPC 635*f* can be appropriately disposed for space saving.

The display unit 63 can be opened and closed relative to the optical finder 60 when pivoted around the pivotal axis formed of the pin Pb and the Pin Pc (see FIGS. 11A and 11B and FIGS. 12A to 12E and will be described later). The opening and closing action of the display unit 63 will next be described.

[Opening and Closing Action of Display Unit 63]

FIGS. 11A and 11B and FIGS. 12A to 12E are perspective views for describing the opening and closing action of the display unit 63. FIG. 11A shows the display unit 63 in a fully closed position Qa, and FIG. 11B shows the display unit 63 in a fully open position (released position) Qe. FIGS. 12A to 12E show the action of the display unit 63 when moving from the fully closed position Qa to the fully open position Qe.

Removing the bias spring 65, the focus plate 62, and the spacer 64 from the optical finder 60 as shown in FIGS. 11A and 11B, one can see that the display unit 63 can pivot around the axis formed of the rocket-shaped pin (cylindrical pin having a conical tip) Pc, which fits into the through hole Ha (FIG. 8) of the holder 633, and the pin Pb (FIG. 7) attached to the holder 633. The display unit 63 can thus change its attitude between the fully closed position Qa, where an opening OP (FIG. 11B) formed in a lower portion of the optical finder 60 is blocked so that the inside of the optical finder 60 is sealed, and the fully open position Qe, which is pivotally spaced apart from the fully closed position Qa, for example, by 47 degrees. In other words, the display unit 63 set in the fully closed position Qa (in a set state) can block the opening OP communicating with the internal space formed in the optical finder 60, whereas the display unit 63 can be moved from the set state to the state in the fully open position Qe (non-set state) in which the display unit 63 is not set in the fully closed position Qa but unblocks the internal space of the optical finder 60. The display unit 63 in the set state described above can display information (such as the focus detection area), for example, superimposed on the subject optical image on the finder window 10 via the internal space of the optical finder 60.

The opening and closing action of the display unit 63 will be described in detail with reference to FIGS. 12A to 12E. The "T"-shaped cam hole Hc is formed in a sidewall 61s located in a lower portion of the pentamirror holder 61h. The "T"-shaped cam hole Hc is formed of a linearly elongated hole along the Y-axis direction (hereinafter also referred to as a "vertically elongated hole") and a linearly elongated hole along the (−Z) direction (hereinafter also referred to as a "horizontally elongated hole") extending from the vicinity of the center of the vertically elongated hole. The pin Pa attached to the display unit 63 engages the cam hole Hc.

In the opening and closing action of the display unit 63, the pin Pa first slightly lifts the display unit 63 from the fully closed position Qa of the display unit 63 positioned at the lower end of the vertically elongated hole of the cam hole Hc, so that the pin Pa is positioned at the entrance of the horizontally elongated hole of the cam hole Hc, as shown in FIG. 12A. The pin Pa then moves along the horizontally elongated hole of the cam hole Hc to the left end (the end in the depth direction), as shown in FIGS. 12C to 12E. In this way, the display unit 63 can stably pivot around the pin Pc (and the opposite pin Pb) via intermediate positions Qc and Qd to the fully open position Qe. It is noted that vertically elongated holes into which the pins Pb and Pc as the pivotal axis fit are provided in the sidewalls 61s of the pentamirror holder 61h, and the vertically elongated holes are long enough in the Y-axis direction for the display unit 63 to be lifted as described above.

As described above, the guide mechanism that guides the pin Pa along the cam hole Hc and the pivot mechanism using the pins Pb and Pc allow the display unit 63 to not only shift outward from the opening OP of the optical finder 60 but also pivot around the pivotal axis formed of the two pins Pb and Pc. To open the display unit 63 set in the fully closed position Qa (in the set state), the display unit 63 is shifted outward from the opening OP and then pivoted around the pivotal axis described above, as illustrated in the procedure shown in FIGS. 12A to 12E. The display unit 63 is thus moved to the state in the fully open position Qe (non-set state). In the opening action of the display unit 63 described above, since the display unit 63 in the fully closed position Qa is first lifted and then pivoted to the fully open position Qe, the sides (glass edges) of the in-finder LCD 631, which are relatively fragile, will not be broken because they will not come into excessive frictional contact with other members (inner wall of the pentamirror holder 61h, for example) disposed around the sides of the in-finder LCD 631.

Figure 13:
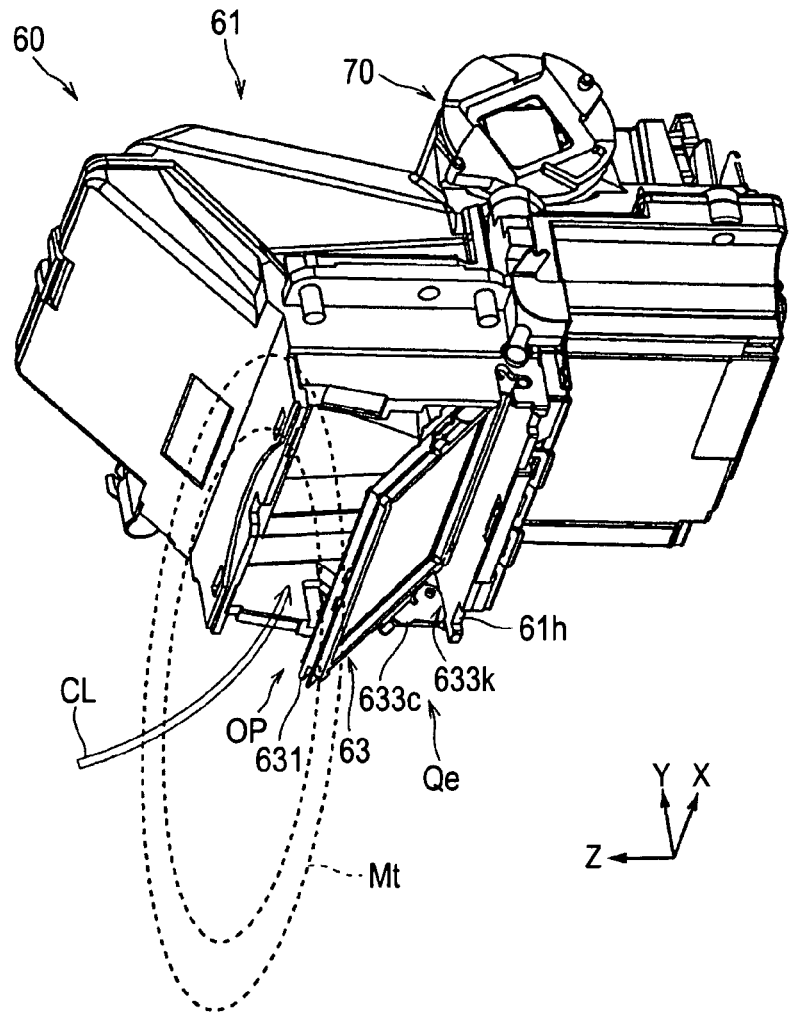
FIG. 13 is a perspective view for describing a fully open position of the display unit.

The inclined attitude of the display unit 63 is maintained in the fully open position Qe, which is pivotally spaced apart from the fully closed position Qa by 47 degrees, because the 47-degree-inclined edge portion 633k (FIG. 10) of the display unit 63 abuts the inner wall of the pentamirror holder 61h, as shown in FIG. 13. That is, the combination of the edge portion 633k of the display unit 63 and the inner wall of the pentamirror holder 61h functions as a mechanical stopper that limits the pivotal motion of the display unit 63 in the direction in which the internal space of the optical finder 60 is unblocked. In this way, the display unit 63 will not pivot excessively. It is noted that when the display unit 63 is attached to the optical finder 60, the LCD FPC 631f and the LED FPC 635f are bent, as shown in FIG. 8 (and the mesh portion in FIG. 5). Using the restoring force (biasing force) produced by the bending operation along with the gravity acting on the display unit 63 assists the pivotal motion of the display unit 63.

As described above, foreign matter (dirt and dust) having attached to the surface of the in-finder LCD 631 in the display unit 63 and foreign matter having entered the internal space of the optical finder 60 can be readily removed by moving the display unit 63 incorporated in the camera body 2 from the fully closed position Qa to the fully open position Qe without disassembling the camera body 2 and inserting, for example, a cleaning tool through an opening formed in the annular mount Mt (broken lines) along the arrow CL shown in FIG. 13.

Figure 14:
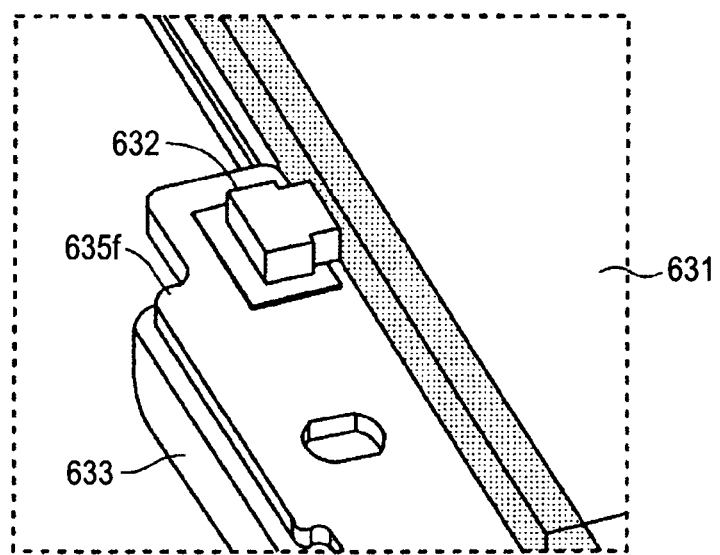
FIG. 14 is an enlarged view of an illumination LED and therearound.

The LED FPC 635f, on which the illumination LED 632 is mounted, and the in-finder LCD 631 are glued on the holder 633 of the display unit 63, as shown in an enlarged view of FIG. 14 illustrating the illumination LED 632 and therearound. Since the in-finder LCD 631 and the illumination LED 632 are disposed in the same plane of the holder 633, the relative positional relationship between the in-finder LCD 631 and the illumination LED 632 will not change when the display unit 63 is moved from the fully closed position Qa to the fully open position Qe for cleaning, whereby the illumination LED 632 can appropriately illuminate the surface of the in-finder LCD 631 and other portions.

As described above, although the inside of the optical finder 60 can be cleaned by moving the display unit 63 to the fully open position Qe, certain amounts of gap are disadvantageously created around the metal holder 633 and the mechanical components (such as the pins Pa to Pc and the cam hole Hc) that are used to open and close the display unit 63. As a result, foreign matter can enter the internal space of the optical finder 60 through the gaps, and the foreign matter having entered the internal space could attach, for example, to the surface of the in-finder LCD 631. To address the problem, the optical finder 60 of the present embodiment is provided with the anti-dust cushion 634 described above to achieve an anti-dust capability of preventing the entry of foreign matter. Prevention of the entry of foreign matter by using the anti-dust cushion 634 will be described below.

Figure 15:
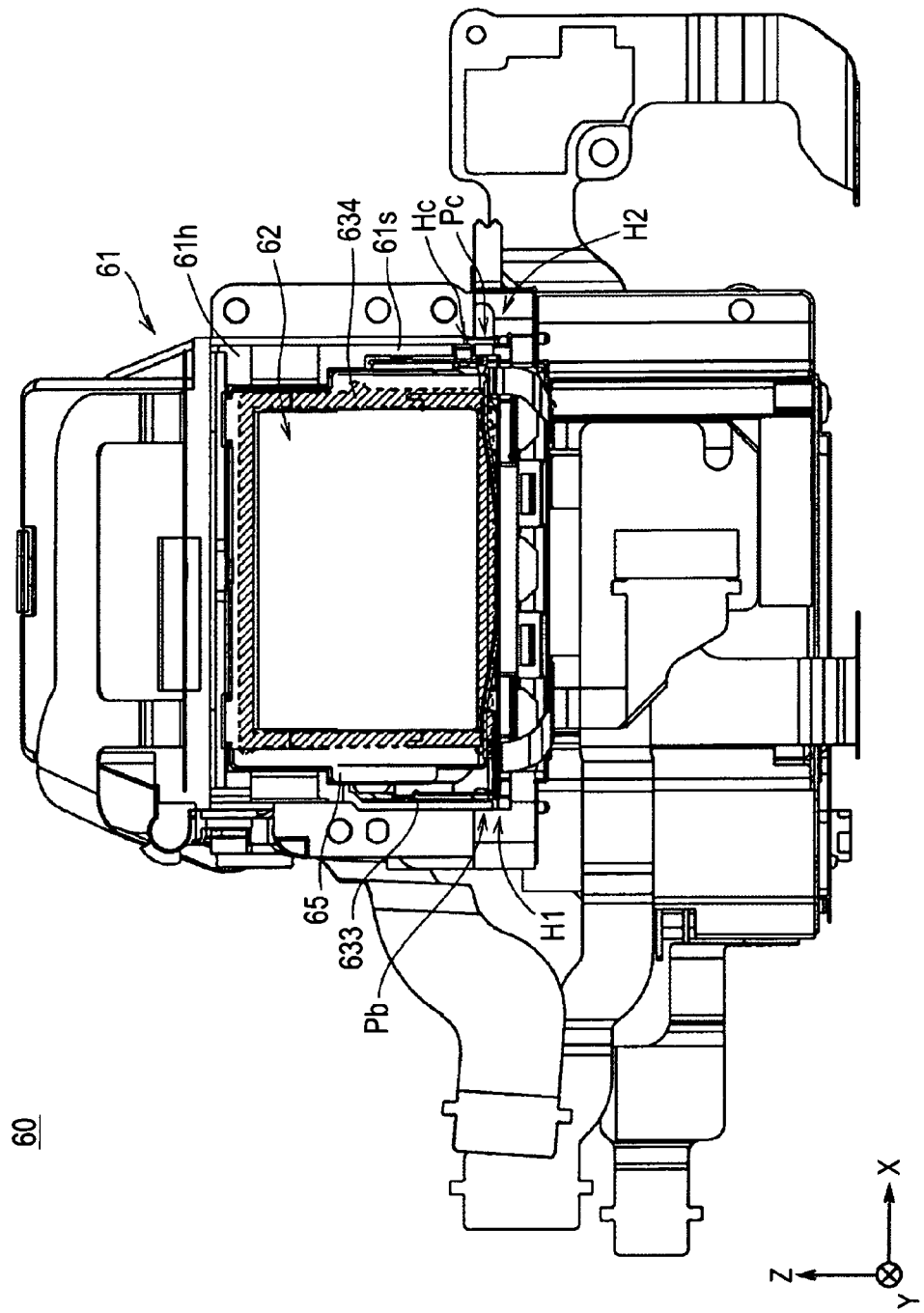
FIG. 15 describes prevention of the entry of foreign matter by using an anti-dust cushion.

FIG. 15 describes prevention of the entry of foreign by using the anti-dust cushion 634 and shows the optical finder 60 viewed from the below (in the −Y direction). When the optical finder 60 is viewed from the below, the anti-dust cushion 634 may not be visually recognized because it is hidden behind the bias spring 65 and the focus plate 62, but FIG. 15 transparently shows the anti-dust cushion 634 (portion hatched with parallel oblique lines).

The anti-dust cushion 634 is disposed in an area inside the mechanical components around which certain amounts of gap are created when the display unit 63 is opened and closed as described above. Specifically, the anti-dust cushion 634, which is shaped into a substantially rectangular frame, is disposed in the inner area sandwiched between two hinges (pivoting portions) H1 and H2 that allows the display unit 63 to pivot around the pins Pb and Pc located at both ends of the pivotal axis of the display unit 63. Disposing the anti-dust cushion 634 as described above can appropriately prevent foreign matter from entering the optical finder 60.

Figure 16A:
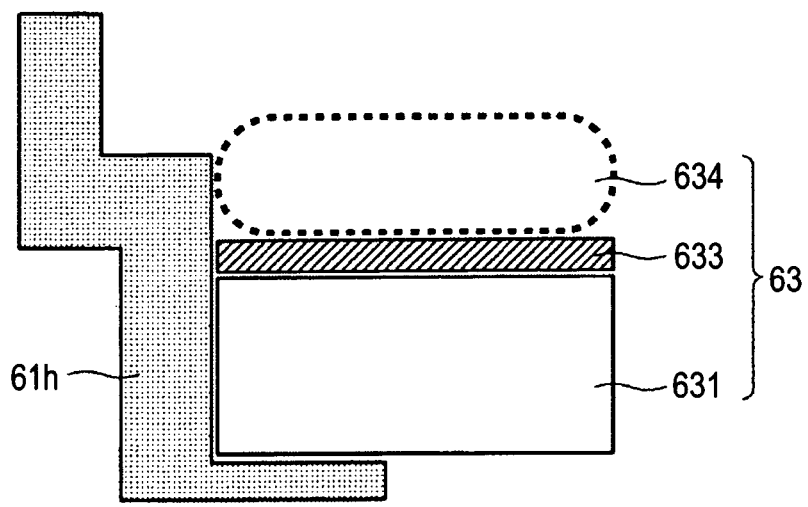
FIGS. 16A and 16B further describe the prevention of the entry of foreign matter by using the anti-dust cushion.
Figure 16B:
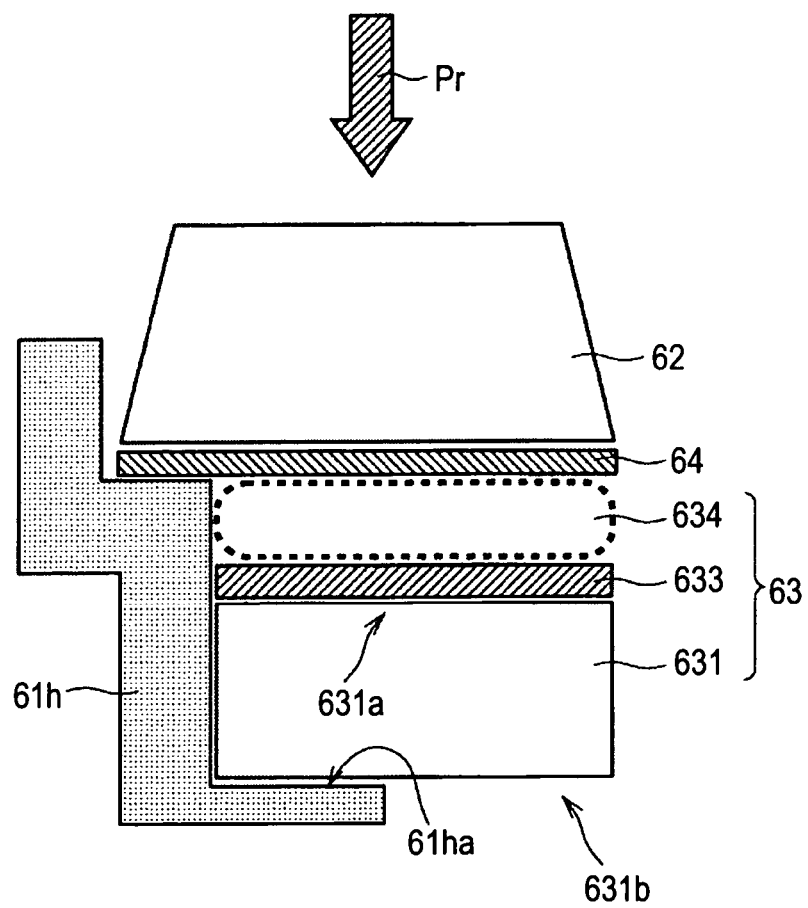

Further, a load (compressive load) Pr produced by the bias spring 65 is exerted on the anti-dust cushion 634 held on the holder 633 of the display unit 63 via the spacer 64 and the focus plate 62, as shown in FIG. 16A, which is a conceptual cross-sectional view. As a result, the anti-dust cushion 634 deforms and fills the gap between the spacer 64 and the holder 633 of the display unit 63, as shown in FIG. 16B, which is a conceptual view. Since the thus compressed and deformed anti-dust cushion 634 disposed between the in-finder LCD 631 and the focus plate 62 increases the airtightness, foreign matter will not enter the optical finder 60 from outside or attach to a surface (outer surface) 631a of the in-finder LCD 631 on the side where the focus plate 62 is present.

To hold the compressed anti-dust cushion 634 with the aid of the load (biasing force) Pr produced by the bias spring 65, a reaction force Fa produced by the anti-dust cushion 634 and a biasing force Fb produced by the bias spring need to satisfy the following condition: Fa<Fb. If the condition is not satisfied, the focus plate 62 may disadvantageously not be in place, resulting in, for example, a focus position error. Conversely, setting the biasing force Fb produced by the bias spring 65 at an excessively large value could deform the focus plate 62 and the spacer 64. Further, the reaction force Fa, the magnitude of which is determined by the thickness, shape, and material of the anti-dust cushion 634, and the biasing force Fb, the magnitude of which is determined by the material and shape of the bias spring 65, need to be set precisely also in consideration of variation in the anti-dust cushion 634 and the bias spring 65 when manufactured. It is therefore preferable to determine appropriate design values of the reaction force Fa produced by the anti-dust cushion 634 and the biasing force Fb produced by the bias spring 65 by actually measuring Fa and Fb including the variation due to manufacturing and evaluating the position and deformation of the focus plate 62 in an actual product.

The thus disposed anti-dust cushion 634 and the compressive deformation thereof caused by the bias spring 65 allow the optical finder 60 to be more tightly sealed, and the improvement in the sealing performance appropriately prevents foreign matter from entering the optical finder 60.

Further, in the optical finder 60, an inner-side surface 631b of the in-finder LCD 631 is in surface contact with and held by a receiving surface 61ha of the pentamirror holder 61h over the entire circumference of the inner-side surface 631b, as shown in FIGS. 16A and 16B, and an appropriate magnitude of load is applied from the bias spring 65. As a result, the gap created between the inner-side surface 631b of the in-finder LCD 631 and the receiving surface 61ha of the pentamirror holder 61h is reduced, whereby prevention of the entry of foreign matter into the optical finder 60 is effectively achieved as well as the prevention of the entry of foreign matter by using the anti-dust cushion 634 described above.

In the optical finder 60 of the imaging apparatus 1 described above, since the display unit 63 can be moved from the fully closed position Qa to the fully open position Qe, where the opening OP of the optical finder 60 is unblocked, as shown in FIGS. 11A, 11B and FIGS. 12A to 12E, foreign matter can be readily removed from the inside of the optical finder 60 even when the display unit 63 is provided.

<Variations>

Figure 17A:
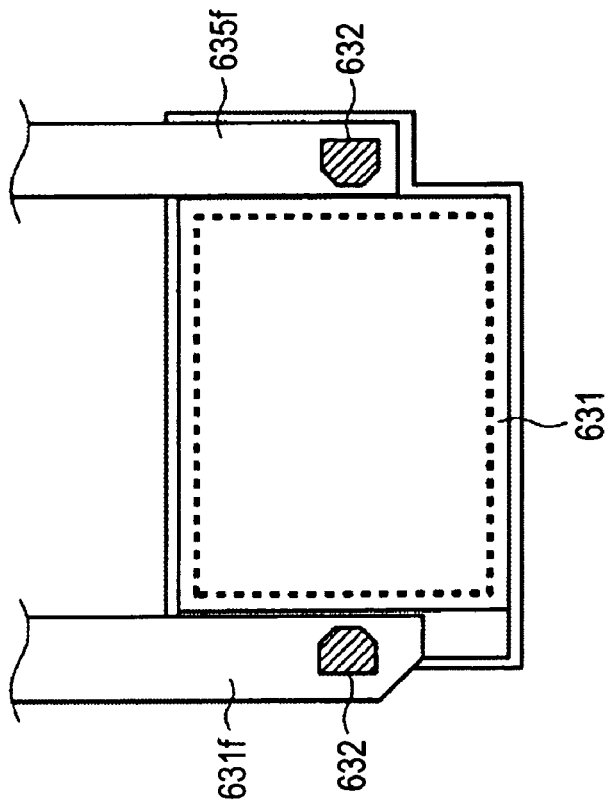
FIGS. 17A and 17B describe an illumination LED according to variations of the invention.
Figure 17B:
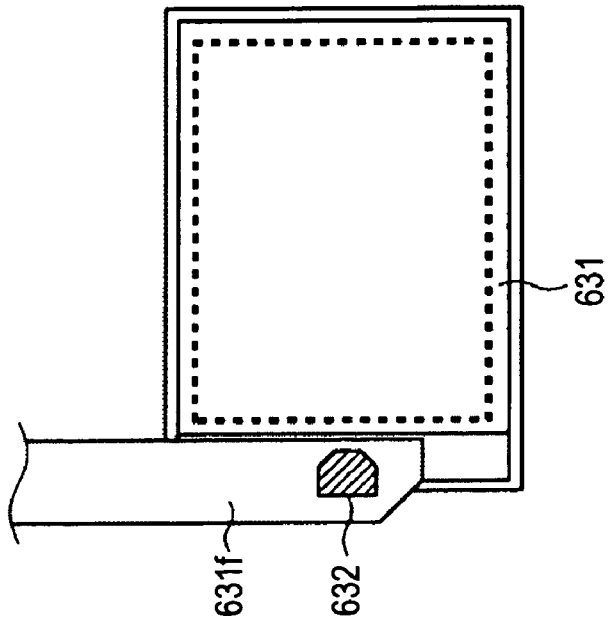

In the embodiment described above, the illumination LED 632 is not necessarily disposed on the LED FPC 635f, but may be mounted on the LCD FPC 631f, as shown in FIG. 17A. In this way, the LED FPC 635f can be omitted, whereby the size of the optical finder 60 can be reduced. Alternatively, the illumination LED 632 may be mounted on both the LED FPC 635f and the LCD FPC 631f, as shown in FIG. 17B. In this way, high-performance illumination with less illumination unevenness can be achieved.

In the embodiment described above, the display unit is not necessarily openable and closable by using the hinges formed, for example, of the pins Pb and Pc, but the display unit 63 may be detachably attached to the optical finder 60 so that the state of the display unit 63 is switched between the set state and the non-set state described above. In this case, foreign matter having entered the optical finder 60 can be more readily cleaned. To separate and remove the display unit 63 from the optical finder 60, however, the LCD FPC 631f and the LED FPC 635f need to be sufficiently long, and a space for housing the FPCs 631f and 635f needs to be provided, for example, in the optical finder 60, or a connector or any other suitable component that allows the LCD FPC 631f and the LED FPC 635f to be attached and detached needs to be provided, for example, in the optical finder 60. When the LCD FPC 631f and the LED FPC 635f can be attached and detached by using a connector or any other suitable component, one can readily exchange the display unit 63 without disassembling the camera body 2, for example, at the time of failure or update to a new product.

In the embodiment described above, the optical finder 60 is not necessarily incorporated in a single lens reflex digital camera, but may be incorporated in a single lens reflex silver-salt film camera.

The invention has been described in detail, but the above description is presented by way of example in every aspect and the invention is not limited thereto. It should be construed that a large number of variations that have not been presented are contemplated without departing from the scope of the invention.

What is claimed is:

1. An optical finder unit comprising:
light guide means for guiding an optical image of a subject to a finder window through an internal space formed in the optical finder unit; and
a display unit capable of displaying information on the finder window through the internal space when the display unit is in a set state in which the display unit is set in a predetermined position,
wherein the display unit in the set state blocks an opening communicating with the internal space,
the display unit can transit from the set state to a non-set state in which the display unit is not set in the predetermined position but unblocks the internal space, and
wherein a predetermined mechanism allows the display unit to be shifted outward from the opening communicating with the internal space and pivot around a predetermined pivotal axis, and
the display unit in the set state transits to the non-set state by causing the display unit to shift outward from the opening and then pivot around the predetermined pivotal axis.

2. The optical finder unit according to claim 1,
wherein the predetermined mechanism includes a stopper that limits the pivotal motion of the display unit in the direction in which the internal space is unblocked.

3. The optical finder unit according to claim 1,
further comprising a focus plate where the subject optical image having passed through an imaging optical system is focused, and
an elastic member provided between the display unit and the focus plate.

4. The optical finder unit according to claim 1,
wherein the predetermined mechanism includes two pivoting portions that allow the display unit to pivot at two ends that relate to the predetermined pivotal axis, and
an elastic member shaped into a substantially rectangular frame is provided in an inner area sandwiched between the two pivoting portions.

5. The optical finder unit according to claim 1,
wherein the display unit includes
a body with a display screen, and
a light emitter capable of projecting light to the display screen, and
the body and the light emitter are disposed on a predetermined member.

6. An imaging apparatus comprising:
an optical finder unit including light guide means for guiding an optical image of a subject to a finder window through an internal space formed in the optical finder unit, and a display unit capable of displaying information on the finder window through the internal space when the display unit is in a set state in which the display unit is set in a predetermined position, wherein the display unit in the set state blocks an opening communicating with the internal space, and the display unit can transit from the set state to a non-set state in which the display unit is not set in the predetermined position but unblocks the internal space, wherein a predetermined mechanism allows the display unit to be shifted outward from the opening communicating with the internal space and pivot around a predetermined pivotal axis, and the display unit in the set state transits to the non-set state by causing the display unit to shift outward from the opening and then pivot around the predetermined pivotal axis.

7. An optical finder unit comprising:

a light guide configured to guide an optical image of a subject to a finder window through an internal space formed in the optical finder unit; and a display unit capable of displaying information on the finder window through the internal space when the display unit is in a set state in which the display unit is set in a predetermined position, wherein the display unit in the set state blocks an opening communicating with the internal space, and the display unit can transit from the set state to a non-set state in which the display unit is not set in the predetermined position but unblocks the internal space, wherein a predetermined mechanism allows the display unit to be shifted outward from the opening communicating with the internal space and pivot around a predetermined pivotal axis, and the display unit in the set state transits to the non-set state by causing the display unit to shift outward from the opening and then pivot around the predetermined pivotal axis.

8. An imaging apparatus comprising:

an optical finder unit including a light guide configured to guide an optical image of a subject to a finder window through an internal space formed in the optical finder unit, and a display unit capable of displaying information on the finder window through the internal space when the display unit is in a set state in which the display unit is set in a predetermined position, wherein the display unit in the set state blocks an opening communicating with the internal space, and the display unit can transit from the set state to a non-set state in which the display unit is not set in the predetermined position but unblocks the internal space, wherein a predetermined mechanism allows the display unit to be shifted outward from the opening communicating with the internal space and pivot around a predetermined pivotal axis, and the display unit in the set state transits to the non-set state by causing the display unit to shift outward from the opening and then pivot around the predetermined pivotal axis.

\* \* \* \* \*